UNITED STATES PATENT OFFICE.

RICHARD VON FOREGGER, OF NEW YORK, N. Y., ASSIGNOR TO THE ROESSLER & HASSLACHER CHEMICAL COMPANY, OF NEW YORK, N. Y., A CORPORATION.

TOPICAL REMEDY.

No. 916,692.  Specification of Letters Patent.  Patented March 30, 1909.

Application filed April 5, 1906. Serial No. 309,996.

*To all whom it may concern:*

Be it known that I, RICHARD VON FOREGGER, a subject of the Emperor of Austria-Hungary, and a resident of the borough of Richmond, city of New York, State of New York, have invented certain new and useful Improvements in Topical Remedies, of which the following is a specification.

The invention relates to topical remedies and has particular reference to those adapted for the treatment of the skin by a method of oxidation.

The preparations hitherto used on the skin for disinfecting, purifying or bleaching the same have been mostly of a corrosive or irritative nature. In order to overcome the unpleasant effects due to the lack of disinfection or purification, deodorization has been resorted to by means of the use of perfumes acting to neutralize the effects. Those preparations which have been used to produce antisepsis have had no soothing effects upon the skin, and vice versa, the same preparation not being used for an antiseptic which also had the property of deodorizing. The result of using the so-called skin bleachers is destruction of the sound tissues of the skin and has a mere surface action and by no means an advantageous one.

It is well known that oxygen, in particular nascent or active oxygen, has the property of disinfecting, deodorizing, purifying and bleaching, although up to the present time it has not been possible to obtain such direct oxidation effects in connection with said skin preparations. I have found that when I add a suitable powder, the characteristic feature of which is the liberation of active oxygen at the point of contact with moisture, to the basic material of an ordinary skin preparation as, for instance, talcum powder, face powder, foot powder, bath powder or face cream, the deodorizing, disinfecting, bleaching and purifying effect upon the skin is very pronounced. Moreover I have found that such preparations are of marked curative effect upon the skin, the active oxygen of the same being absorbed by the cells thus assisting the formation of healthful tissue and producing an elastic, soft and smooth looking skin. Such direct oxidation is possible by using in such compounds, for instance, the peroxids or perborates of magnesium, calcium, strontium and zinc, or perborate of sodium, which resemble each other in that they all possess a certain percentage of available oxygen which is easily liberated by appropriate treatment.

The characteristic feature of the peroxids and perborates as set forth being liberation of active oxygen upon contact with moisture, moist organic substances or acids, it is evident that, for example, when a skin preparation containing one of these ingredients is applied to the skin that the action is as follows: If the preparation is in either powdered or pasty form and is applied as such, the acidity of the skin secretions as well as the humidity of the air and skin will react with the peroxid or perborate in liberating its available oxygen in nascent form, and that as these reagents, namely skin secretions and humidity, are not present in sufficient quantities to cause an immediate reaction the reaction will be a gradual one and will last for hours. Moreover the peroxids or perborates used are non-toxic, calcium, sodium, magnesium and strontium being of an entirely harmless nature even if used internally, and zinc having a mild soothing, and non-irritative effect upon the skin.

As an example of the adaptation of the invention for use as a face cream I would suggest the use of white oil or petrolatum mixed with paraffin or vaseline together with a small percentage of castile soap and either sodium perborate or zinc peroxid or both in the proportions of 25 parts of white oil, 60 parts of vaseline, 3 parts of soap, 8 parts of sodium perborate and 4 parts of zinc peroxid.

For a foot powder where the oxidation should be a slower and continuous process, and where antiseptic and deodorizing as well as absorbing effects are to be produced, I would suggest the use of talcum powder, sodium perborate, calcium peroxid and zinc peroxid in the proportions of 15 parts of talcum powder, one part of sodium perborate, three parts of calcium peroxid and one or two parts of zinc peroxid. It is evident that in each case the main factor of utility is the available active oxygen.

For a toilet power of more general application for toilet purposes, I would suggest the use of talcum powder, perborate of sodium and peroxid of zinc in the proportion of ninety-two parts of talcum powder, four parts of perborate of sodium and four parts of peroxid of zinc. The perborate of sodium might be omitted in which case I would suggest the use of the talcum powder and peroxid of zinc in the proportion of ninety-two parts of talcum powder and eight parts of peroxid of zinc. If the peroxid of zinc were substituted in the last formula by perborate of sodium it would be advisable to increase the proportion of perborate of sodium relative to the talcum powder, as perborate of sodium is not as stable as peroxid of zinc.

As perborates are chemically included within the broader term "peroxids" where the term "peroxids" is used I intend to include perborates. It is evident that various powders or other substances as desired may be combined with the peroxids and perborates set forth and in any proportions, and that other non-toxic substances holding available oxygen may be used instead of the peroxids or perborates set forth without departing from the spirit of my invention.

What I claim and desire to secure by Letters Patent of the United States is:—

1. An oxygenated skin preparation, free from acid, containing a basic material, perborate of sodium and zinc peroxid, substantially in the proportions and as described.

2. An oxygenated talcum, toilet powder, free from acid and consisting of talc and perborate of sodium and peroxid of zinc distributed throughout the talc, substantially in the proportions and as described.

3. An oxygenated talcum, toilet powder, free from acid and consisting of talc and peroxid of zinc distributed throughout the talc, substantially in the proportions and as described.

In witness whereof I have hereunto signed my name in the presence of two subscribing witnesses.

RICHARD VON FOREGGER.

Witnesses:
J. GALLWITZ,
SEABURY C. MASTICK